(12) United States Patent
Yoshimura (10) Patent No.: US 10,066,586 B2
(45) Date of Patent: Sep. 4, 2018

(54) AIR CLEANER FOR INTERNAL COMBUSTION ENGINE

(71) Applicant: TOYOTA BOSHOKU KABUSHIKI KAISHA, Aichi-ken (JP)

(72) Inventor: Hiroyuki Yoshimura, Nagoya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 137 days.

(21) Appl. No.: 15/389,900

(22) Filed: Dec. 23, 2016

(65) Prior Publication Data

US 2017/0211526 A1    Jul. 27, 2017

(30) Foreign Application Priority Data

Jan. 25, 2016   (JP) ................. 2016-011382

(51) Int. Cl.
| | |
|---|---|
| F02M 35/024 | (2006.01) |
| B01D 53/04 | (2006.01) |
| F02M 35/02 | (2006.01) |
| B01D 46/00 | (2006.01) |
| B01J 20/28 | (2006.01) |

(52) U.S. Cl.
CPC ..... *F02M 35/0212* (2013.01); *B01D 46/0036* (2013.01); *B01D 53/0407* (2013.01); *B01J 20/28033* (2013.01); *F02M 35/0201* (2013.01); *F02M 35/024* (2013.01); *F02M 35/0218* (2013.01); *B01D 2253/102* (2013.01); *B01D 2253/108* (2013.01); *B01D 2257/702* (2013.01)

(58) Field of Classification Search
CPC ............ B01D 53/0407; B01D 46/0036; B01D 2253/102; B01D 2253/108; B01D 2257/702; B01J 20/28033; F02M 35/024; F02M 35/0201; F02M 35/0212; F02M 35/0218

USPC ......... 96/108, 121, 134, 138, 147; 55/385.3, 55/490, 506, 511; 123/198 E

See application file for complete search history.

(56) References Cited

U.S. PATENT DOCUMENTS

| | | | | |
|---|---|---|---|---|
| 3,678,663 | A * | 7/1972 | Hansen | F02M 25/08 55/DIG. 28 |
| 5,030,264 | A * | 7/1991 | Klotz | B01D 46/0006 55/481 |
| 6,383,268 | B2 * | 5/2002 | Oda | B01D 46/0005 55/385.3 |
| 7,507,279 | B2 | 3/2009 | Mizutani et al. | |
| 7,758,678 | B2 * | 7/2010 | Yoshida | B01D 46/0036 96/11 |

(Continued)

FOREIGN PATENT DOCUMENTS

| | | |
|---|---|---|
| JP | 2003-42017 | 2/2003 |
| JP | 2007-32409 | 2/2007 |

*Primary Examiner* — Frank M Lawrence, Jr.
(74) *Attorney, Agent, or Firm* — Greenblum & Bernstein, P.L.C.

(57) ABSTRACT

An adsorption filter for an air cleaner for an internal combustion engine is mounted by being inserted inside a second housing along a face of the adsorption filter. In an inner face of the second housing, the adsorption filter is guided to a mounting position in an inserting direction of the adsorption filter. While the movement of the adsorption filter to the mounting position is allowed by elastic deformation, the adsorption filter is restricted from falling off from the mounting position.

11 Claims, 5 Drawing Sheets

(56) References Cited

U.S. PATENT DOCUMENTS

| | | | |
|---|---|---|---|
| 8,082,906 B2 * | 12/2011 | Hirata | B01D 53/0431 123/184.21 |
| 2005/0284298 A1 * | 12/2005 | Hirata | B01D 53/0415 96/134 |
| 2007/0113740 A1 * | 5/2007 | Oda | B01D 46/0005 96/134 |
| 2008/0168902 A1 * | 7/2008 | Suzuki | B01D 53/0407 96/109 |

* cited by examiner

AIR CLEANER FOR INTERNAL COMBUSTION ENGINE

BACKGROUND OF THE INVENTION

The present invention relates to an air cleaner for an internal combustion engine.

Some air cleaners for an internal combustion engine include an adsorption filter that adsorbs fuel vapor leaked through an intake passage when the internal combustion engine is in a stopped state (e.g., see Japanese Laid-Open Patent Publication No. 2003-42017).

The air cleaner disclosed in the publication includes a case having an inlet, a cap having an outlet, and a filter element arranged between the case and the cap. The adsorption filter is arranged inside the cap to cover the opening of the cap.

Ribs arranged at intervals in the circumferential direction extend from the inner face of the cap. Pins to be fused are arranged to extend from the respective ribs. The adsorption filter is fixed to the cap by hooking mounting holes arranged in the adsorption filter to the respective pins and fusing the pins.

SUMMARY OF THE INVENTION

In the air cleaner disclosed in Publication No. 2003-42017, mounting of the adsorption filter to the cap requires a process to hook the mounting holes of the adsorption filter to the pins of the cap and a process to fuse the pins. This complicates the process to mount the adsorption filter.

It is an objective of the present invention to provide an air cleaner for an internal combustion engine that facilitates accurate mounting of an adsorption filter.

To achieve the above objective, an air cleaner for an internal combustion engine includes a first housing, a second housing, a filter element, and a sheet-shaped adsorption filter that is arranged inside the second housing. The first housing includes an inlet and a first opening. The second housing includes an outlet and a second opening. The filter element is arranged between the first opening and the second opening. The adsorption filter adsorbs fuel vapor that flows into the interior of the second housing through the outlet. The adsorption filter is mounted by being inserted into the interior of the second housing along a face of the adsorption filter. In an inner face of the second housing, the adsorption filter is guided to a mounting position in an inserting direction of the adsorption filter. While movement of the adsorption filter to the mounting position is allowed by elastic deformation, the adsorption filter is restricted from falling off from the mounting position.

DETAILED DESCRIPTION OF THE INVENTION

First Embodiment

With reference to FIGS. 1 to 5, a first embodiment according to the present invention will now be described.

Figure 1:
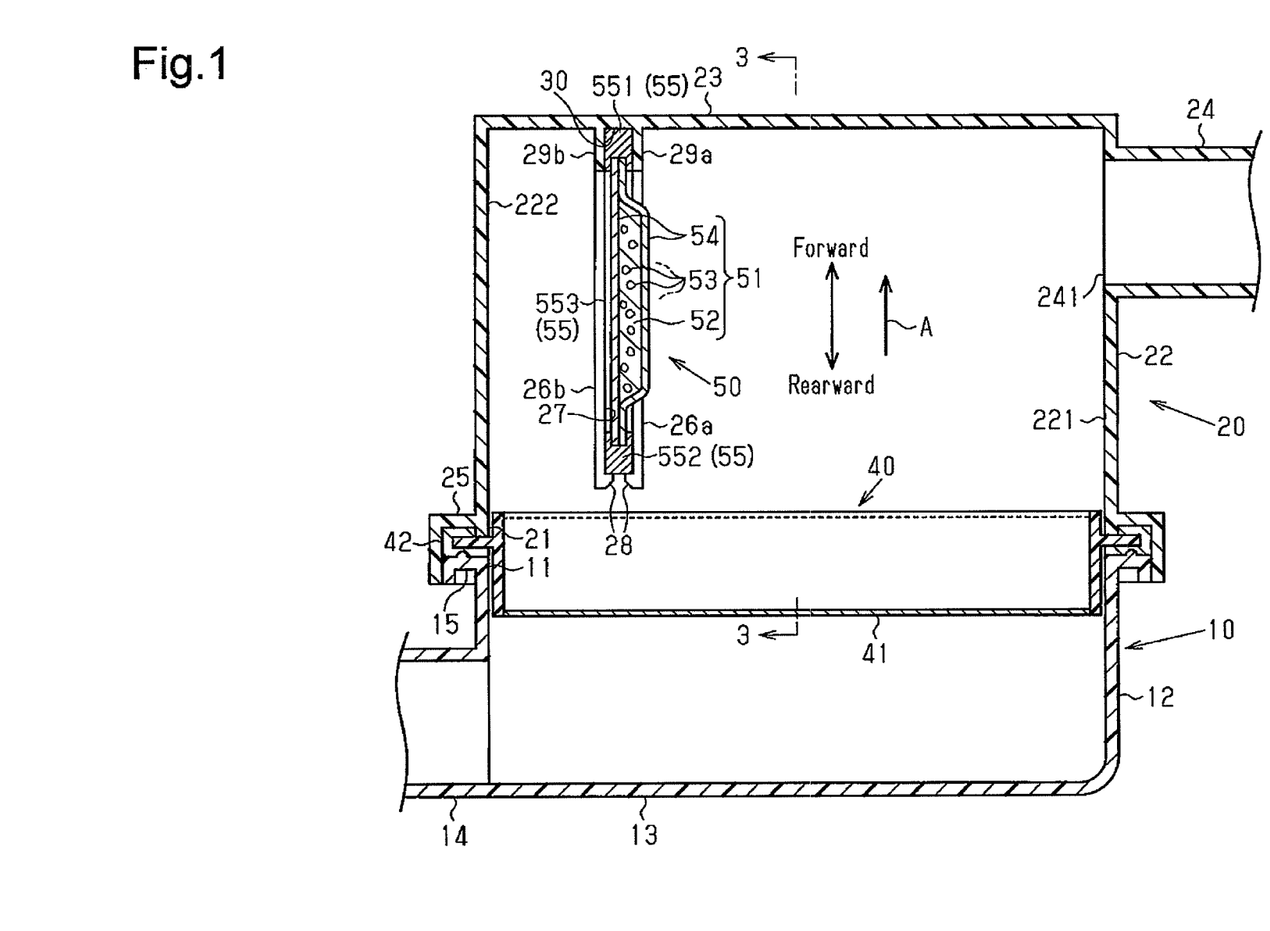
FIG. 1 is a cross-sectional view of an air cleaner for an internal combustion engine according to a first embodiment.

As shown in FIG. 1, an air cleaner is arranged in the intake passage of the internal combustion engine in a vehicle. The air cleaner includes a first housing 10 having a first opening 11 and a second housing 20 having a second opening 21. The first opening 11 and the second opening 21 are shaped generally quadrilateral in a planar view. The housings 10 and 20 are both formed of a rigid plastic material.

As shown in FIG. 1, the first housing 10 includes a bottom wall 13 and a surrounding wall 12, which surrounds the first opening 11. A tubular inlet 14 extends outward from the surrounding wall 12. The first housing 10 is provided with a flange 15 formed on the periphery of the first opening 11 over the entire perimeter.

The second housing 20 includes a top wall 23 and a surrounding wall 22, which surrounds the second opening 21. A tubular outlet 24 extends outward from the surrounding wall 22. The second housing 20 is provided with a flange 25 formed on the periphery of the second opening 21 over the entire perimeter. An airflow meter (not shown), which detects an intake air amount, is mounted on the outlet 24.

A filter element 40, which captures dust contained in intake air, is arranged between the first opening 11 of the first housing 10 and the second opening 21 of the second housing 20. The filter element 40 includes a filtration portion 41 and a rectangular loop-shaped seal portion 42 arranged on the outer circumferential edge of the filtration portion 41. The filtration portion 41 is shaped generally quadrilateral in a planar view and formed by, e.g., folding a sheet of filter material such as filter paper or nonwoven fabric in a pleated shape. The flange 15 of the first housing 10 and the flange 25 of the second housing 20 hold the seal portion 42 in-between over the entire perimeter. Thus, the seal portion 42 seals a space between the first housing 10 and the second housing 20.

A sheet-shaped adsorption filter 50 is arranged inside the second housing 20. The adsorption filter 50 adsorbs fuel vapor that flows into the interior of the second housing 20 through the outlet 24.

Figure 2:
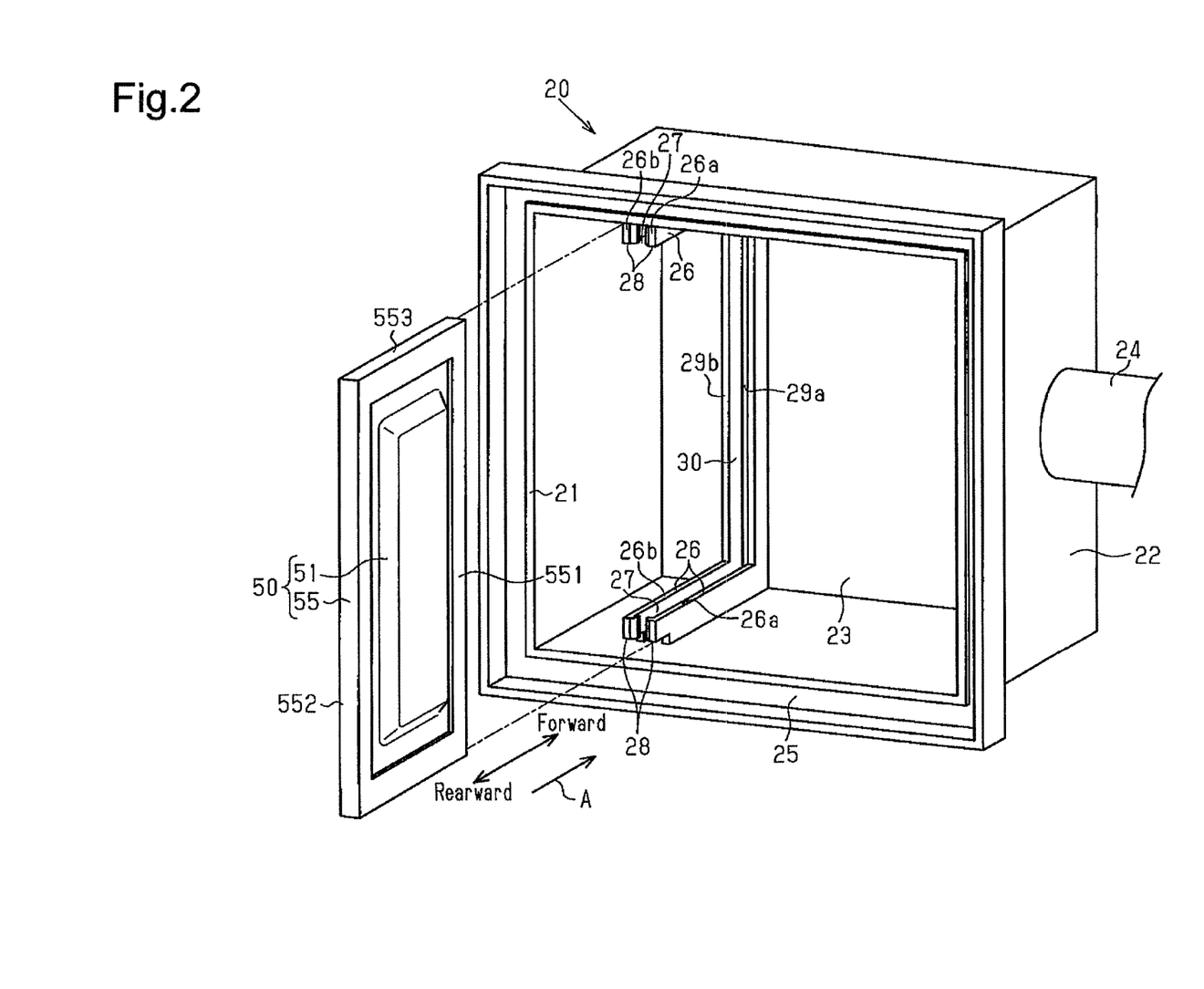
FIG. 2 is an exploded perspective view of a second housing and an adsorption filter included in the air cleaner according to the first embodiment.
Figure 3:
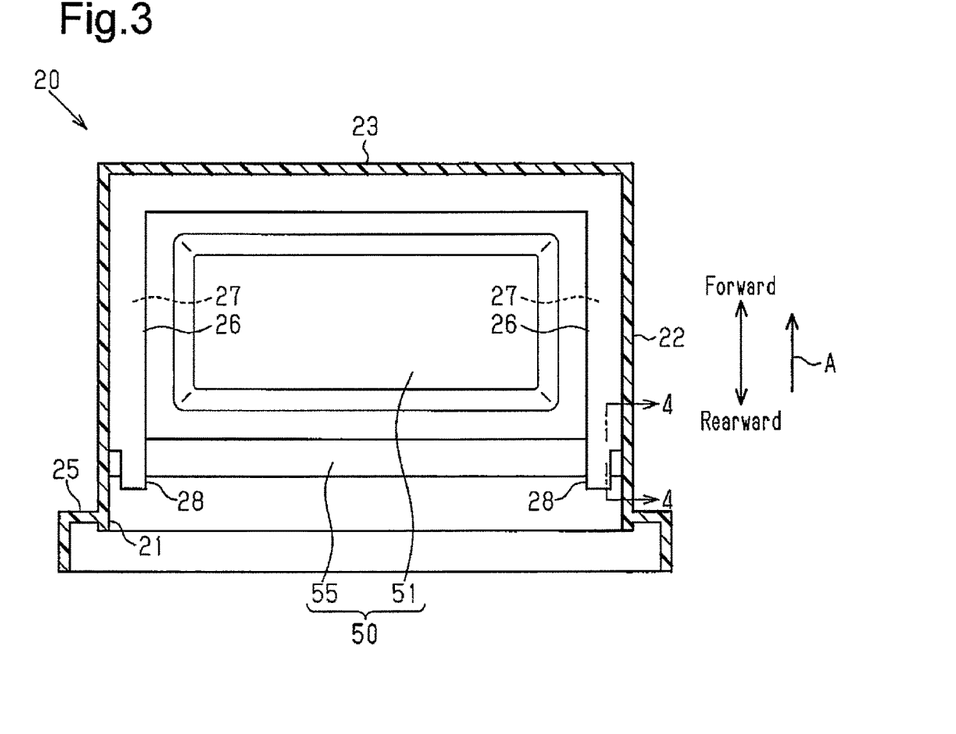
FIG. 3 is a cross-sectional view of the second housing and the adsorption filter taken along line 3-3 of FIG. 1.

As shown in FIGS. 1 to 3, the adsorption filter 50 is arranged on the surrounding wall 22 to face an opening portion 241 of the outlet 24. The adsorption filter 50 includes an adsorption portion 51, which is shaped rectangular in a planar view and adsorbs fuel vapor, and a rectangular loop-shaped frame 55, which is arranged on the outer circumferential edge of the adsorption portion 51.

As shown in FIG. 1, the surrounding wall 22 includes an inner face 221 having an opening portion 241 and an inner face 222 that faces the inner face 221. The adsorption filter 50 is arranged closer to the inner face 222 than to the inner face 221.

The adsorption portion 51 includes a sheet base 52, granular adsorption material 53, which is held by the sheet base 52 and is substantially uniformly dispersed, and cover sheets 54, which cover two opposite surfaces of the sheet base 52. As the adsorption material 53, a porous material such as, e.g., activated charcoal and zeolites is preferable. As the sheet base 52 and the cover sheet 54, nonwoven fabric, e.g., formed of plastic fiber is preferable.

As shown in FIG. 1, the frame 55 holds the outer circumferential edge of the cover sheet 54 from the two opposite sides. The frame 55 is formed of a rigid plastic material.

The structure to mount the adsorption filter 50 on the second housing 20 will now be described.

As shown in FIGS. 1 to 3, the adsorption filter 50 is mounted to the second housing 20 by being inserted into the interior of the second housing 20 along the face of the adsorption filter 50. In the following, a direction in which the adsorption filter 50 is inserted is abbreviated to an inserting direction A.

The surrounding wall 22 includes two inner faces that face each other (the inner face on the upper side and the inner face on the lower side in FIG. 2). A guide portion 26 that extends in the inserting direction A to reach the top wall 23 is formed on each of the inner faces. Each of the guide portions 26 includes two projections 26a and 26b, which are spaced from each other. A guide groove 27 is formed between the projections 26a and 26b, which constitute one of the guide portions 26. The space between the projections 26a and 26b, which constitute the guide portion 26, is set to be approximately the same as the thickness of the frame 55 of the adsorption filter 50 and set to be entirely uniform in the inserting direction A.

The frame 55 of the adsorption filter 50 includes side edge portions 553 that extend in the inserting direction A on two opposite sides. The guide grooves 27 on the two opposite sides guide the side edge portions 553 to the mounting position.

Two front side projections 29a and 29b are formed on the inner face of the top wall 23. The front side projections 29a and 29b connect the two guide portions 26, which are formed on the respective inner faces that face each other of the surrounding wall 22. The front side projections 29a and 29b are spaced apart from each other. A front side groove 30 is formed between the front side projections 29a and 29b.

The frame 55 includes a front edge portion 551, which is located on the front side in the inserting direction A, and side edge portions 553, which extend in the inserting direction A. In a state in which the adsorption filter 50 is mounted to the second housing 20, the front edge portion 551 is fitted to the front side groove 30, and the side edge portions 553 are fitted to the guide grooves 27.

Figure 4:
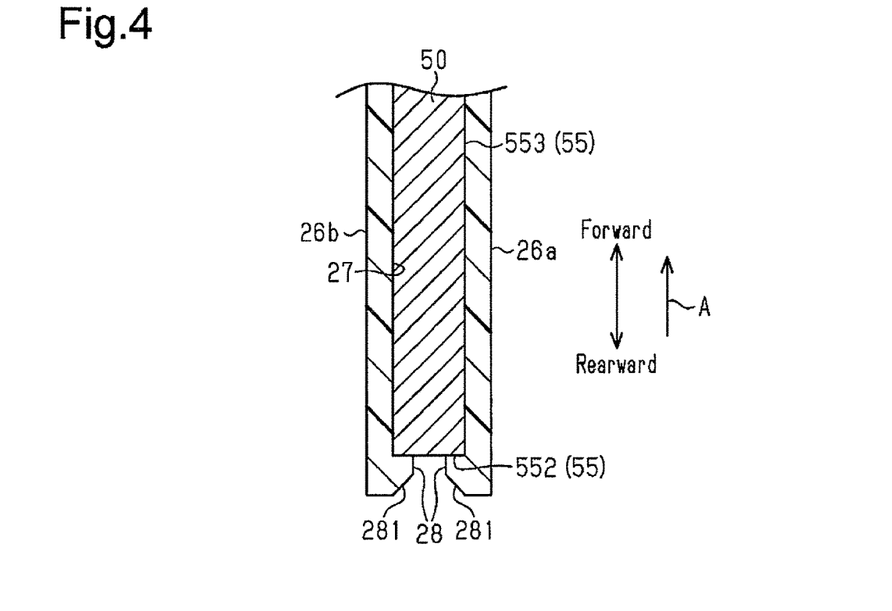
FIG. 4 is a cross-sectional view taken along line 4-4 of FIG. 3.

As shown in FIGS. 1, 2, and 4, a restriction portion 28 is formed at the rear end of each guide portion 26 in the inserting direction A. The restriction portion 28 is configured such that the corresponding projections 26a and 26b, which constitute the corresponding guide portion 26, project rearward and extend toward each other. As shown in FIG. 3, each of the two restriction portions 28 is apart from the inner face of the surrounding wall 22, on which the corresponding guide portion 26 is formed.

As shown in FIG. 4, two sloped faces 281, which are sloped to be separated from each other toward the rear side, are formed at each rear end of the two restriction portions 28.

The two restriction portions 28 come in contact with the rear edge of the frame 55 in the inserting direction A. This restricts the adsorption filter 50 from falling off from the mounting position.

Operation when the adsorption filter 50 is mounted on the second housing 20 will now be described.

Figure 5:
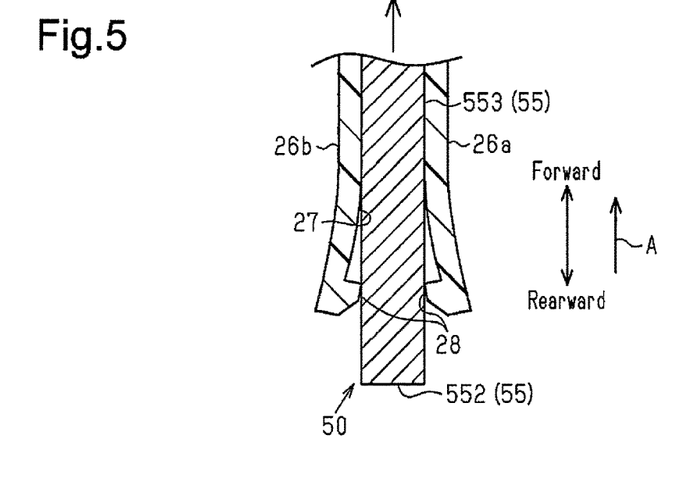
FIG. 5 is a cross-sectional view corresponding to FIG. 4, illustrating the half-way state when the adsorption filter is mounted in the second housing according to the first embodiment.

When the front edge portion 551 of the frame 55 of the adsorption filter 50 is pressed against the sloped faces 281 arranged on each of the two restriction portions 28 in the inserting direction A, the pressing force elastically deforms the restriction portion 28 in a direction to spread out. This allows the side edge portions 553 of the frame 55 to be inserted into the guide grooves 27 as shown in FIG. 5. When the adsorption filter 50 is inserted further, the side edge portions 553 of the frame 55 are guided toward the mounting position while sliding on the guide grooves 27. At the mounting position, the front edge portion 551 of the frame 55 is fitted to the front side groove 30.

The air cleaner for an internal combustion engine according to the present embodiment as described above provides the following operational advantages.

(1) The adsorption filter 50 is mounted by being inserted into the interior of the second housing 20 along a face of the adsorption filter 50. The guide grooves 27 and the restriction portions 28 are formed on two inner faces of the second housing 20 that face each other. The guide grooves 27 extend in the insertion direction A and guide the adsorption filter 50 to the mounting position. While allowing movement of the adsorption filter 50 to the mounting position by elastic deformation, the restriction portions 28 restrict the adsorption filter 50 from falling off from the mounting position.

According to such a configuration, when the adsorption filter 50 is mounted by being inserted into the second housing 20, the adsorption filter 50 is guided to the mounting position along the guide grooves 27, which are arranged on the two inner faces of the second housing 20 that face each other. At this time, elastic deformation of the restriction portion 28 allows movement of the adsorption filter 50 to the mounting position. Thus, it is easy to mount the adsorption filter 50 to the second housing 20. In addition, the restriction portions 28 restrict the adsorption filter 50 from falling off from the mounting position. Thus, the adsorption filter 50 can be mounted easily and accurately.

(2) The adsorption filter 50 includes the adsorption portion 51, which adsorbs fuel vapor, and the frame 55, which is arranged on the outer circumferential edge of the adsorption portion 51. The frame 55 is guided by the guide grooves 27.

According to such a configuration, the outer circumferential edge of the adsorption portion 51 is reinforced by the frame 55. Thus, the adsorption filter 50 can be stably mounted to the second housing 20.

(3) The guide portions 26 are respectively formed on the two inner faces of the second housing 20 that face each other and extend in the inserting direction A. Each of the two guide portions 26 includes the corresponding two projections 26a and 26b that are spaced apart from each other. Each of the two guide portions 26 is constituted by the corresponding projections 26a and 26b between which the corresponding guide groove 27 is formed. Each guide groove 27 is fitted to the corresponding side edge portion 553 of the frame 55.

Such a configuration allows for setting the guide grooves 27 over a broad coverage in the inserting direction A. Thus, the guide grooves 27 can accurately guide the adsorption filter 50. In addition, the guide grooves 27 can retain the side edge portions 553 of the frame 55.

(4) The guide grooves 27 are respectively formed on the two inner faces of the second housing 20 that face each other. The guide grooves 27 on the two opposite sides are respectively fitted to the side edge portions 553 on the two opposite sides of the frame 55.

According to such a configuration, the side edge portions 553 on the two opposite sides of the frame 55 are respectively guided by the guide grooves 27 on the two opposite sides. Thus, compared to a configuration in which only one of the side edge portions 553 is guided by a guide groove 27, the orientation of the adsorption filter 50 is stabilized when being guided. Furthermore, the guide grooves 27 on the two opposite sides are respectively fitted to the side edge portions 553 on the two opposite sides of the frame 55. Thus, the frame 55 can be stably retained.

(5) The restriction portions 28 are respectively formed at the rear ends of the two guide portions 26 in the inserting direction A and come in contact with the rear edge of the frame 55 to restrict the adsorption filter 50 from falling off from the mounting position.

According to such a configuration, the front edge portion 551 of the frame 55 is pressed against the restriction portions 28 to elastically deform the restriction portions 28. Therefore, the restriction portions 28 can be easily embodied.

(6) Each of the two restriction portions 28 is apart from the inner face of the surrounding wall 22 on which the corresponding guide portion 26 is formed. Thus, the restriction portion 28 can be smoothly elastically deformed.

(7) The two front side projections 29a and 29b configured to hold the front edge portion 551 of the frame 55 in-between are formed on an inner face of the second housing 20.

According to such a configuration, the two front side projections 29a and 29b hold the front edge portion 551 of the frame 55 so that the adsorption filter 50 is tightly mounted.

(8) The adsorption filter 50 is arranged to face the opening portion 241 of the outlet 24, which is formed on the surrounding wall 22 of the second housing 20. This facilitates contact of the adsorption filter 50 with fuel vapor flowing into the second housing 20 through the opening portion 241 of the outlet 24. Thus, fuel vapor is efficiently adsorbed.

(9) The adsorption filter 50 is arranged to be closer to an inner face that faces the inner face having the outlet 24 of the surrounding wall 22 of the second housing 20 than to the inner face having the outlet 24 of the surrounding wall 22 of the second housing 20.

The flow of intake air is disturbed by passing through the adsorption filter 50. Thus, the shorter the distance between the adsorption filter 50 and the outlet 24, i.e., an airflow meter is, the more easily the flow of intake air flowing into the airflow meter is disturbed. This increases the dispersion in the detection value of the intake air amount detected by the airflow meter.

In this regard, according to the above configuration, the distance between the adsorption filter 50 and the outlet 24 is ensured. This decreases the ratio of intake air passing through the adsorption filter 50 to the intake air flowing into the airflow meter. Furthermore, even if the flow of intake air is disturbed by passing through the adsorption filter 50, the disturbance is weakened before flowing into the airflow meter. Thus, the dispersion in the detection value of the airflow meter is limited.

Second Embodiment

Figure 6:
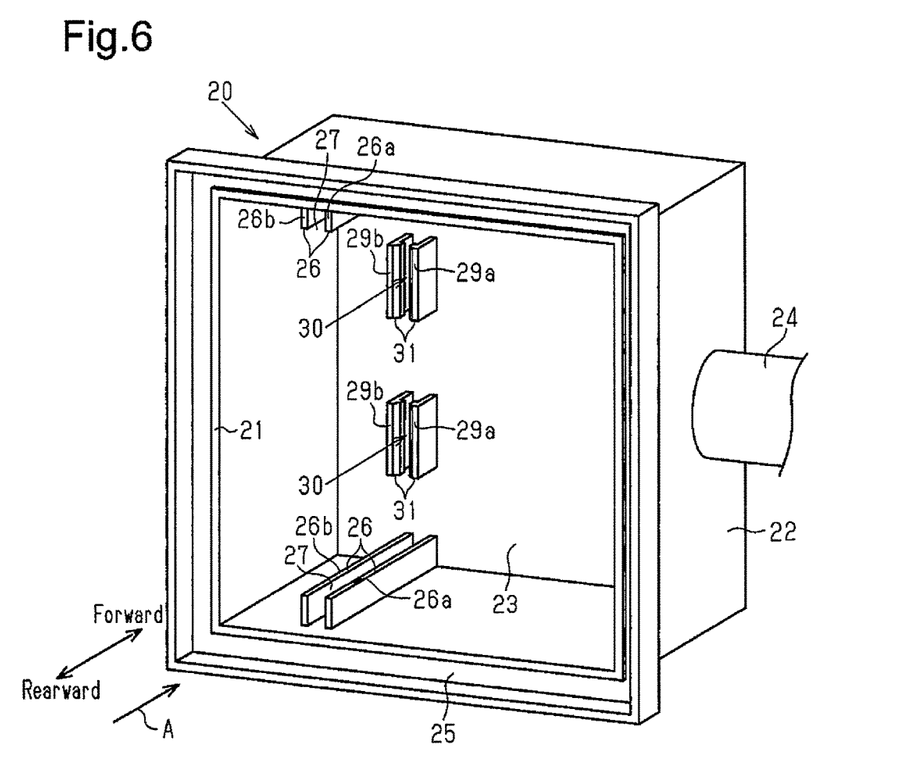
FIG. 6 is a perspective view illustrating the inside structure of a second housing included in an air cleaner according to a second embodiment.
Figure 7:
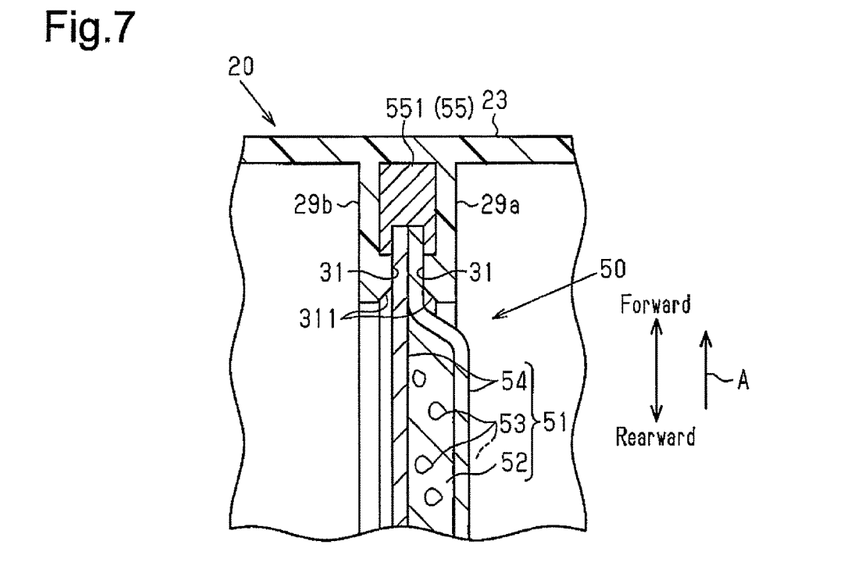
FIG. 7 is a partial cross-sectional view around a front side groove in the air cleaner according to the second embodiment.

With reference to FIGS. 6 and 7, a second embodiment will now be described focusing on differences from the first embodiment. In the present embodiment, the inside structure of the second housing 20 is different from that of the first embodiment.

As shown in FIG. 6, in the second housing 20 according to the present embodiment, pairs (two pairs in the present embodiment) of front side projections 29a and 29b are separately arranged in the extending direction. The front side projections 29a and 29b are apart from the guide portions 26.

As shown in FIGS. 6 and 7, a restriction portion 31 is formed at each of the rear ends of the pairs of front side projections 29a and 29b in the inserting direction A. The restriction portions 31 are each configured such that the corresponding front side projections 29a and 29b project rearward and extend toward each other. Each of the restriction portions 31 includes two sloped faces 311 at the rear end. The sloped faces 311 are sloped to be separated from each other toward the rear side.

The restriction portions 31 are each in contact with the rear edge of the front edge portion 551 of the frame 55. This restricts the adsorption filter 50 from falling off from the mounting position.

No restriction portions (corresponding to the restriction portions 28 in the first embodiment) are arranged at the rear ends of the guide portions 26.

The air cleaner for an internal combustion engine according to the present embodiment as described above provides the following new operational advantage in addition to the operational advantages (1) to (4) and (7) to (9) in the first embodiment.

(10) The restriction portions 31 are each formed at the rear ends of the corresponding front side projections 29a and 29b that face each other and are in contact with the rear edge of the front edge portion 551 of the frame 55. This restricts the adsorption filter 50 from falling off from the mounting position.

According to such a configuration, the restriction portions 31 are formed at the rear ends of the pairs of the front side projections 29a and 29b, and no restriction portions are formed at the rear ends of the guide projections 26. Thus, until the front edge portion 551 of the frame 55 reaches the restriction portions 31, the restriction portions 31 do not affect insertion of the adsorption filter 50. Therefore, the adsorption filter 50 can be inserted with a small amount of force.

<Modifications>

The above embodiment may be modified in the following forms.

Figure 8:
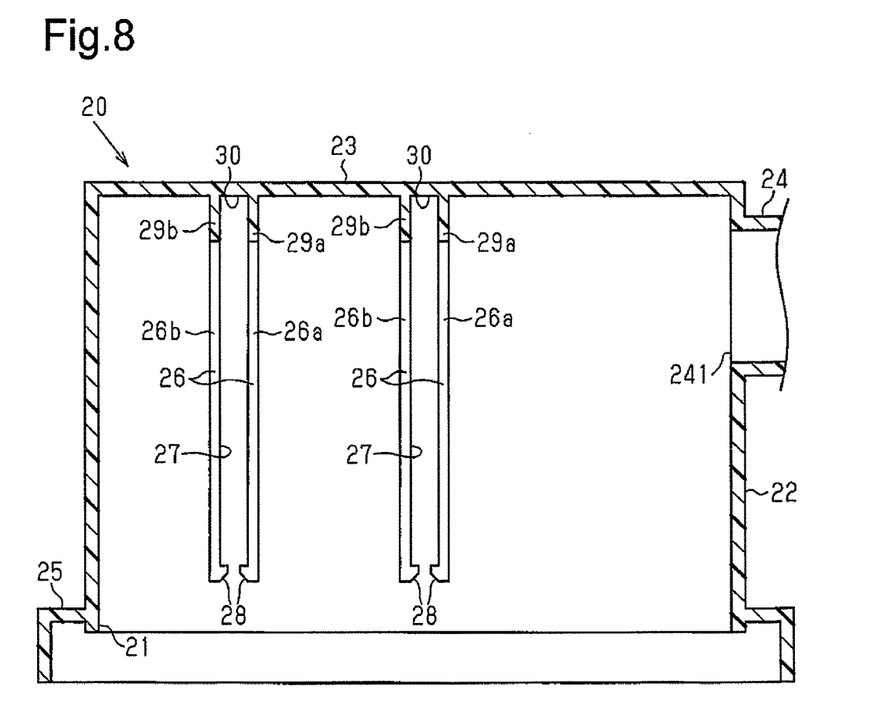
FIG. 8 is a cross-sectional view illustrating the cross-sectional structure of a second housing in a modification.

A plurality of mounting positions for adsorption filters 50 may be prepared. In this case, for example, as shown in FIG. 8, two mounting positions, which have different distances from the opening portion 241 of the outlet 24, may be prepared, and two guide grooves 27 and the like may be formed at each mounting position to guide the corresponding adsorption filter 50.

The flow of intake air flowing into the outlet 24 is affected by the mounting position of the adsorption filter 50. The flow of intake air is also changed by a configuration other than an air cleaner such as the exhaust amount of the internal combustion engine.

In this regard, the above configuration allows the adsorption filter 50 to be mounted at a mounting position at which the flow of intake air becomes more appropriate according to a configuration such as the exhaust amount of the internal combustion engine.

In the first embodiment, the two front side projections 29a and 29b may be omitted.

Each guide portion 26 may be separated into pieces in the inserting direction A.

Portions at which the guide portions 26 face each other may be formed partially in the inserting direction A.

The guide projections 26 may be omitted. In this case, the front side groove 30 formed between the two front side projections 29a and 29b guides the adsorption filter 50.

The insertion direction A of the adsorption filter 50 is not limited to the direction orthogonal to the top wall 23. The insertion direction A may be changed to any direction.

The invention claimed is:

1. An air cleaner for an internal combustion engine comprising:
    a first housing;
    a second housing;
    a filter element; and
    a sheet-shaped adsorption filter that is arranged inside the second housing, wherein
    the first housing includes an inlet and a first opening,
    the second housing includes an outlet and a second opening,
    the filter element is arranged between the first opening and the second opening,
    the adsorption filter adsorbs fuel vapor that flows into an interior of the second housing through the outlet,
    the adsorption filter is mounted by being inserted into the interior of the second housing along a face of the adsorption filter,
    in an inner face of the second housing, the adsorption filter is guided to a mounting position in an inserting direction of the adsorption filter, and
    while movement of the adsorption filter to the mounting position is allowed by elastic deformation, the adsorption filter is restricted from falling off from the mounting position.

2. The air cleaner according to claim 1, wherein
    the adsorption filter includes an adsorption portion that adsorbs fuel vapor and a frame that is arranged on an outer circumferential edge of the adsorption portion, and
    at the frame, the adsorption filter is guided to the mounting position in the inserting direction.

3. The air cleaner according to claim 2, wherein
    a guide portion that extends in the inserting direction is formed on an inner face of the second housing,
    the guide portion includes two projections that are spaced apart from each other,
    a groove is formed between the projections, which constitute the guide portion,
    the groove guides the adsorption filter to the mounting position in the inserting direction,
    the groove is fitted to a side edge portion of the frame.

4. The air cleaner according to claim 3, wherein
    the groove comprises two grooves,
    the grooves are respectively formed on two inner faces of the second housing that face each other,
    the grooves are respectively fitted to both side edge portions of the frame.

5. The air cleaner according to claim 3, wherein
    a restriction portion is formed on a rear end of the guide portion in the inserting direction,
    the restriction portion comes in contact with a rear edge of the frame in the inserting direction to restrict the adsorption filter from falling off from the mounting position.

6. The air cleaner according to claim 5, wherein the restriction portion is apart from the inner face of the second housing on which the guide portion is formed.

7. The air cleaner according to claim 2, wherein two front side projections configured to hold a front edge portion of the frame in the inserting direction in-between are formed on an inner face of the second housing.

8. The air cleaner according to claim 7, wherein
    a front side groove is formed between the front side projections, and
    the front side groove guides the adsorption filter to the mounting position in the inserting direction.

9. The air cleaner according to claim 7, wherein
    a restriction portion is formed on a rear end of the front side projections in the inserting direction,
    the restriction portion comes in contact with a rear edge of the front edge portion of the frame in the inserting direction to restrict the adsorption filter from falling off from the mounting position.

10. The air cleaner according to claim 1, wherein the adsorption filter is arranged to face an opening portion of the outlet formed on a surrounding wall of the second housing.

11. The air cleaner according to claim 1, wherein
    the adsorption filter comprises a plurality of adsorption filters that is mounted at a plurality of mounting positions inside the second housing,
    in inner faces of the second housing, the adsorption filters are guided to the respective mounting positions,
    the adsorption filters are restricted from falling off from the respective mounting positions.

* * * * *